(12) United States Patent
Yamada et al.

(10) Patent No.: US 9,135,540 B2
(45) Date of Patent: Sep. 15, 2015

(54) IMAGE PROCESSING APPARATUS, IMAGE PROCESSING METHOD, AND PROGRAM FOR PROCESSING BLACK CHARACTERS AT HIGH RESOLUTION

(71) Applicant: CANON KABUSHIKI KAISHA, Tokyo (JP)

(72) Inventors: Akitoshi Yamada, Yokohama (JP); Ryosuke Iguchi, Kawasaki (JP); Junichi Nakagawa, Tokyo (JP); Mitsuhiro Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/033,701

(22) Filed: Sep. 23, 2013

(65) Prior Publication Data

US 2014/0016141 A1 Jan. 16, 2014

Related U.S. Application Data

(63) Continuation of application No. PCT/JP2013/058718, filed on Mar. 26, 2013.

(30) Foreign Application Priority Data

Apr. 4, 2012 (JP) .................. 2012-085550

(51) Int. Cl.
*G06F 15/00* (2006.01)
*G06K 15/02* (2006.01)
*H04N 1/60* (2006.01)
*H04N 1/64* (2006.01)
*G06F 3/12* (2006.01)
*G06K 1/00* (2006.01)

(52) U.S. Cl.
CPC .......... *G06K 15/1876* (2013.01); *G06F 3/1211* (2013.01); *G06F 3/1244* (2013.01); *G06K 15/1853* (2013.01); *H04N 1/6072* (2013.01); *H04N 1/648* (2013.01); *G06F 3/122* (2013.01)

(58) Field of Classification Search
CPC . G06K 15/02; G06K 15/102; G06K 15/1817; G06K 15/1853; G06K 15/1876; G06F 3/12; G06F 3/122; G06F 3/1211; G06F 3/1247; G06F 3/1284; H04N 1/6072; H04N 1/648
USPC ......... 358/1.1, 1.2, 1.9, 3.01, 3.03, 3.06, 518, 358/521; 382/162, 167, 232, 244, 251, 252
See application file for complete search history.

(56) References Cited

U.S. PATENT DOCUMENTS

| | | | |
|---|---|---|---|
| 6,429,948 B1 * | 8/2002 | Rumph et al. | 358/1.15 |
| 2009/0002739 A1 | 1/2009 | Lapstun et al. | |
| 2011/0032554 A1 * | 2/2011 | Matsuhira | 358/1.9 |

FOREIGN PATENT DOCUMENTS

| | | | |
|---|---|---|---|
| JP | 2006203921 A | 8/2006 | |
| JP | 2008294606 A | 12/2008 | |
| JP | 2009119870 A | 6/2009 | |

*Primary Examiner* — Gabriel Garcia
(74) *Attorney, Agent, or Firm* — Canon U.S.A., Inc. IP Division

(57) ABSTRACT

An image processing apparatus includes an acquiring unit configured to acquire first image data representing gradation of a black character image, and second image data having a resolution lower than that of the first image data and representing gradation of a color image; a first generating unit configured to generate first dot data in accordance with a gradation value of each pixel in the first image data acquired by the acquiring unit; and a second generating unit configured to assign a number of dots to each pixel in the second image data, the number being greater than the maximum number of dots to be assigned by the first generating unit to each pixel in the first image data, and generating dot data for forming an image having an image attribute, in accordance with a gradation value of each pixel in the second image data acquired by the acquiring unit.

15 Claims, 15 Drawing Sheets

IMAGE PROCESSING APPARATUS, IMAGE PROCESSING METHOD, AND PROGRAM FOR PROCESSING BLACK CHARACTERS AT HIGH RESOLUTION

CROSS-REFERENCE TO RELATED APPLICATIONS

This application is a Continuation of International Patent Application No. PCT/JP2013/058718, filed Mar. 26, 2013 and published as WO/2013/150915, which claims the benefit of Japanese Patent Application No. 2012-085550, filed Apr. 4, 2012, both of which are hereby incorporated by reference herein in their entirety.

TECHNICAL FIELD

The present invention relates to an image processing apparatus, an image processing method, and a program.

BACKGROUND ART

A method is known in which edited image data or image data obtained by optical scanning is separated into character and photographic portions and these portions are subjected to image processing individually.

In the technique described in Patent Literature (PTL) 1, continuous tone data and bi-level data are individually encoded by a computer, and transferred to and decoded by an inkjet printer. In the printer, the continuous tone data is halftoned to bi-level color data. The bi-level data and the bi-level color data are combined to form print data, which is then printed.

CITATION LIST

Patent Literature

PTL 1: United States Patent Application Publication No. 2009/002739

With an increase in printing speed of printers and an increase in resolution of input images, there has been recently a tendency toward an increase in not only data transfer time, but also data processing time in printers.

With the method described above, the amount of image data transfer can be reduced by compressing the amount of image data transferred between a printer driver and the printer. However, the amount of processing in the printer after data expansion does not particularly change.

In business documents, where the quality of black characters is considered very important, black characters are required to be printed at high resolution. In the method described above, when an input image is processed at high resolution to improve the quality of black characters, the amount of data to be stored and processed in the printer increases with the square of the resolution. In particular, processing multi-level data of a color image at high resolution causes heavy load.

The present invention has been made in view of the problems described above. An object of the present invention is to generate data for image formation without causing heavy load.

SUMMARY OF INVENTION

The present invention provides an image processing apparatus including an acquiring unit configured to acquire first image data representing gradation of a black character image, and second image data having a resolution lower than that of the first image data and representing gradation of a color image; a first generating unit configured to generate first dot data indicating whether to form a dot for forming an image having a character attribute, in accordance with a gradation value of each pixel in the first image data acquired by the acquiring unit; and a second generating unit configured to generate dot data indicating whether to form a dot for forming an image having an image attribute, in accordance with a gradation value of each pixel in the second image data acquired by the acquiring unit. The number of dots that can be assigned by the second generating unit to each pixel in the second image data is greater than the number of dots assigned by the first generating unit to each pixel in the first image data. The image processing apparatus further includes a third generating unit configured to generate, on the basis of the first dot data and the second dot data, image formation data for forming an image on a recording medium.

Further features of the present invention will become apparent from the following description of exemplary embodiments with reference to the attached drawings.

DESCRIPTION OF EMBODIMENTS

Embodiments of the present invention will now be described in detail with reference to the drawings.

Figure 1:
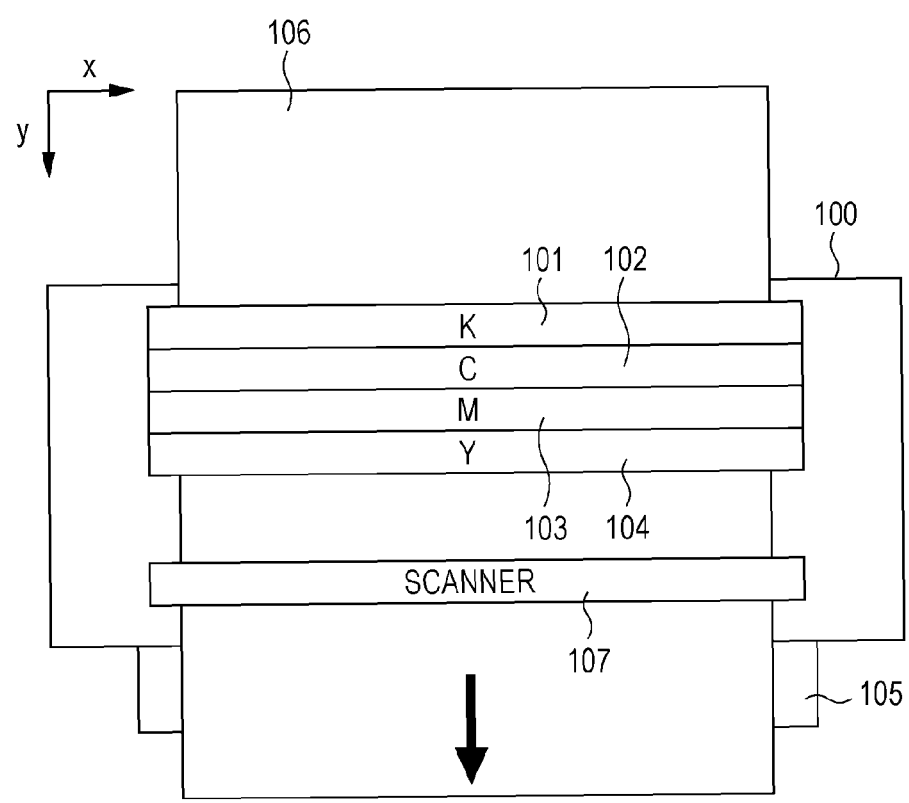
FIG. 1 schematically illustrates an inkjet printer according to an embodiment of the present invention.

FIG. 1 schematically illustrates a printer which is an inkjet recording apparatus according to an embodiment of the present invention. The printer of the present embodiment is a full-line type recording apparatus. As illustrated in FIG. 1, the printer includes recording heads 101 to 104. Each of the recording heads 101 to 104 has nozzle rows corresponding to the width of a recording medium 106, arranged at pitches of 1200 dpi in the x direction (predetermined direction), and each nozzle row having a plurality of nozzles for ejecting the same type of ink. The recording heads 101 to 104 are recording heads that eject inks of black (K), cyan (C), magenta (M), and yellow (Y), respectively. The recording head of the present embodiment is formed by arranging, in the y direction as illustrated, the recording heads 101 to 104 that eject different types of inks.

Figure 2:
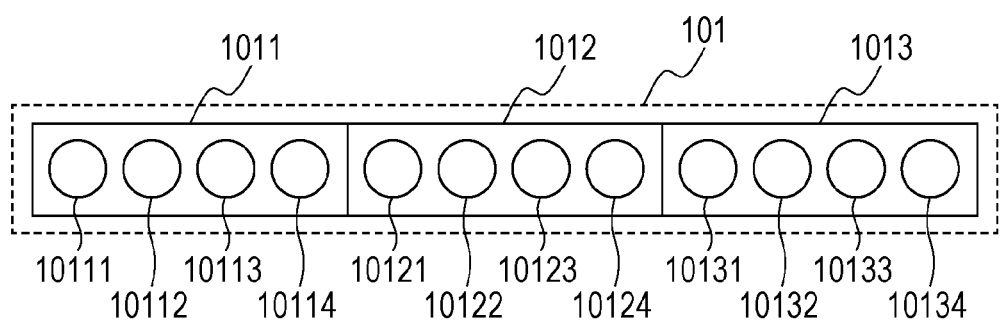
FIG. 2 illustrates a configuration of a recording head according to an embodiment that can be used in the present invention.

FIG. 2 illustrates a nozzle arrangement of the recording head 101. As illustrated, the recording head 101 includes a plurality of ejection substrates 1011 to 1013 arranged in the nozzle arrangement direction. The ejection substrate 1011 has a row of nozzles 10111 to 10114, the ejection substrate 1012 has a row of nozzles 10121 to 10124, and the ejection substrate 1013 has a row of nozzles 10131 to 10134. Although description is omitted for simplicity here, each of the ejection substrates 1011 to 1013 has four nozzle rows arranged in the nozzle arrangement direction. The recording heads 101 to 104 eject inks of different colors to the corresponding regions of the recording medium, so as to record a color image on the recording medium. The number of nozzle rows in each of the ejection substrates is not particularly limited. Referring back to FIG. 1, the recording medium 106 is conveyed in the y direction in the drawing by a conveying roller 105 (and other rollers not shown) being rotated by a driving force of a motor (not shown). While the recording medium 106 is being conveyed, an ejecting operation based on recording data is performed, in which ink is ejected from nozzles of each of the recording heads 101 to 104 at a frequency corresponding to the speed of conveyance of the recording medium 106. Thus, dots of each color are recorded at predetermined resolution in accordance with the recording data, and an image of one page of the recording medium 106 is obtained.

At a position downstream of the recording heads 101 to 104 in the y direction, a scanner 107 is disposed in parallel with the recording heads 101 to 104. The scanner 107 has reading elements arranged at predetermined pitches. The scanner 107 is capable of reading an image recorded by the recording heads 101 to 104, and outputting the read image as RGB multi-level data.

A recording apparatus to which the present invention is applicable is not limited to the full-line type apparatus described above. For example, the present invention is also applicable to so-called serial-type recording apparatuses that perform recording by scanning with a recording head or a scanner in a direction intersecting with the direction of conveyance of a recording medium. Although recording heads are provided for respective ink colors in the present embodiment, a single recording head may eject inks of a plurality of colors. Nozzle rows for inks of a plurality of colors may be arranged in a single ejection substrate.

Figure 3:
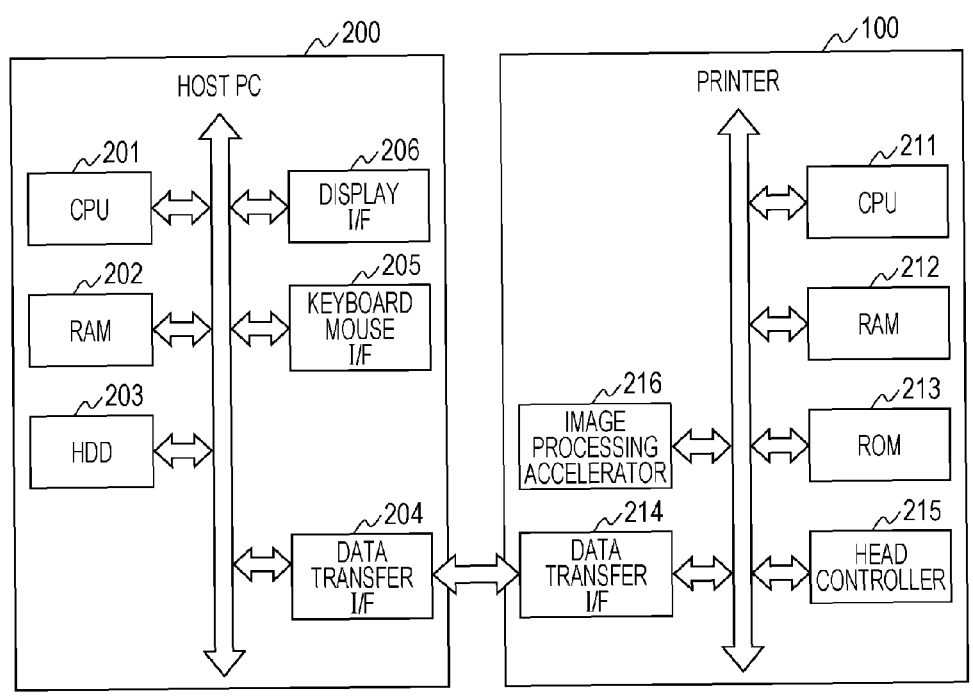
FIG. 3 is a block diagram illustrating a recording system according to an embodiment of the present invention.

FIG. 3 is a block diagram illustrating a recording system according to an embodiment of the present invention. As illustrated in FIG. 3, the recording system includes a printer 100 illustrated in FIG. 1 and a personal computer (PC) 200 serving as a host device for the printer 100.

The host PC 200 mainly includes the following components. A CPU 201 executes processing in accordance with a program stored in a HDD 203 or a RAM 202 serving as a storage means. The RAM 202 is a volatile storage that temporarily stores programs and data. The HDD 203 is a non-volatile storage that also stores programs and data. A quantization mask (described below) is also stored in the HDD 203. In the present embodiment, a data transfer interface (I/F) 204 controls transmission and reception of data between the host PC 200 and the printer 100. Examples of connecting methods used in data transmission and reception include USB, IEEE1394, and LAN. A keyboard mouse I/F 205 is an I/F that controls human interface devices (HIDs), such as a keyboard and a mouse. The user can perform input through this I/F. A display I/F 206 controls display on a display device (not shown).

The printer 100 mainly includes the following components. A CPU 211 executes processing of each embodiment (described below) in accordance with a program stored in a ROM 213 or a RAM 212. The RAM 212 is a volatile storage that temporarily stores programs and data. The ROM 213 is a non-volatile storage that can store programs and table data to be used in processing described below.

A data transfer I/F 214 controls transmission and reception of data between the printer 100 and the host PC 200. A head controller 215 supplies recording data to each of the recording heads 101 to 104 illustrated in FIG. 1, and controls the ejecting operation of the recording heads. Specifically, the head controller 215 is configured to read a control parameter and recording data from a predetermined address in the RAM 212. When the CPU 211 writes the control parameter and recording data to the predetermined address in the RAM 212, the head controller 215 starts processing, so that inks are ejected from the recording heads. A scanner controller 217 controls each reading element of the scanner 107 illustrated in FIG. 1, and outputs the resulting RGB data to the CPU 211.

An image processing accelerator 216 is hardware capable of executing image processing faster than the CPU 211. Specifically, the image processing accelerator 216 is configured to read a parameter and data necessary for image processing from a predetermined address in the RAM 212. When the CPU 211 writes the parameter and data to the predetermined address in the RAM 212, the image processing accelerator 216 is activated to perform predetermined image processing on the data described above. In the present embodiment, determination processing of a quantization mask (described below) is performed by software run by the CPU 211. Conversion of RGB data to CMYK data, determination of dot data by quantization, and image processing for recording such as combining a plurality of pieces of dot data (described below), are performed by hardware processing in the image processing accelerator 216. Also, the image processing accelerator 216 can decompress compressed received data. Note that the image processing accelerator 216 is not an essential component. Depending on specifications of the printer or the like, generation of table parameters and image processing may be executed only by processing in the CPU 211.

First Embodiment

Figure 4:
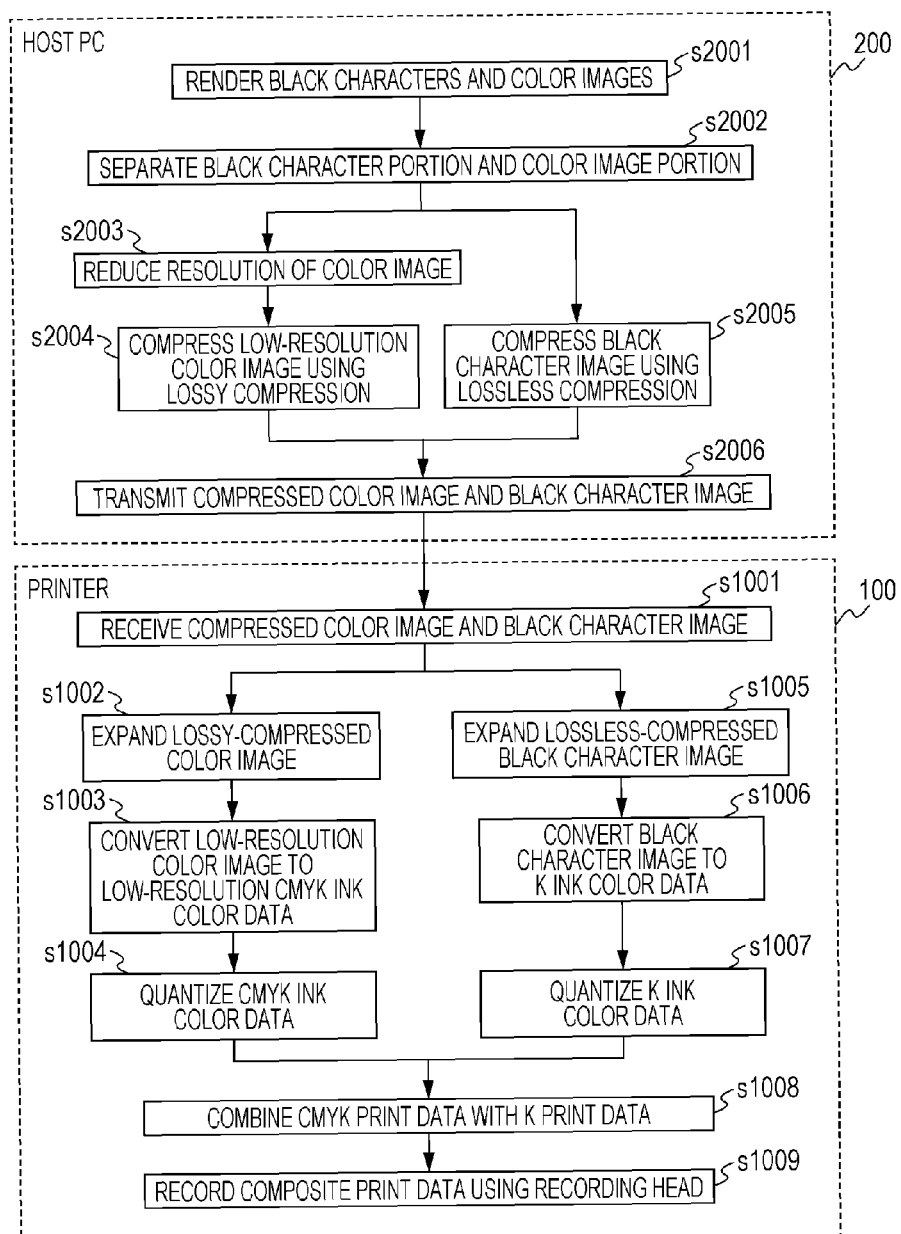
FIG. 4 is a flowchart of image processing according to a first embodiment of the present invention.

FIG. 4 is a flowchart illustrating a flow of image processing executed by an inkjet print system according to a first embodiment of the present invention. A host PC and an inkjet printer to be described here are the host PC 200 and the printer 100 illustrated in FIG. 3.

The flowchart of FIG. 4 will now be described. First, the host PC 200 performs processing of steps s2001 to s2006. In step s2001, the host PC 200 renders an input image including black characters and color images in accordance with a page description language (PDL). In step s2002, the host PC 200 separates a black character portion and a color image portion from the input image to generate a black character image and a color image. In step s2003, the host PC 200 reduces the resolution of the generated color image. In step s2004, the host PC 200 compresses the low-resolution color image using lossy compression. In step s2005, the host PC 200 compresses the generated black character image using lossless compression. In step s2006, the host PC 200 transmits the compressed color image and the compressed black character image to the printer 100.

The host PC 200 performs not only one of the processing of steps s2003 and s2004 and the processing of step s2005 branching off from step s2002 but performs both of them, and brings together the processing results in step s2006. Therefore, the order of which processing is to be performed first is not particularly limited.

Next, the printer 100 performs processing of steps s1001 to s1009.

In step s1001, the printer 100 receives the compressed color image and the compressed black character image from the host PC 200 through the data transfer I/F 214. In step s1002, the printer 100 decompresses the lossy-compressed color image to expand it and generate a low-resolution color image. In step s1003, the printer 100 converts the low-resolution color image to low-resolution CMYK ink color data. In step s1004, the printer 100 quantizes the low-resolution CMYK ink color data to generate CMYK print data. In step s1005, the printer 100 expands the lossless-compressed black character image to generate a black character image. In step s1006, the printer 100 converts the black character image to K ink color data. In step s1007, the printer 100 quantizes the K ink color data to generate K print data. In step s1008, the printer 100 combines the CMYK print data with the K print data to generate composite CMYK print data. In step s1009, the printer 100 records the composite print data using a recording head. The printer 100 performs not only one of the processing of steps s1002 to s1004 and the processing of steps s1005 to s1007 branching off from step s1001 but performs both of them, and brings together the processing results in step s1008. Therefore, the order of which processing is to be performed first is not particularly limited.

Examples of preferred processing performed in each step will now be described in detail.

Figure 5:
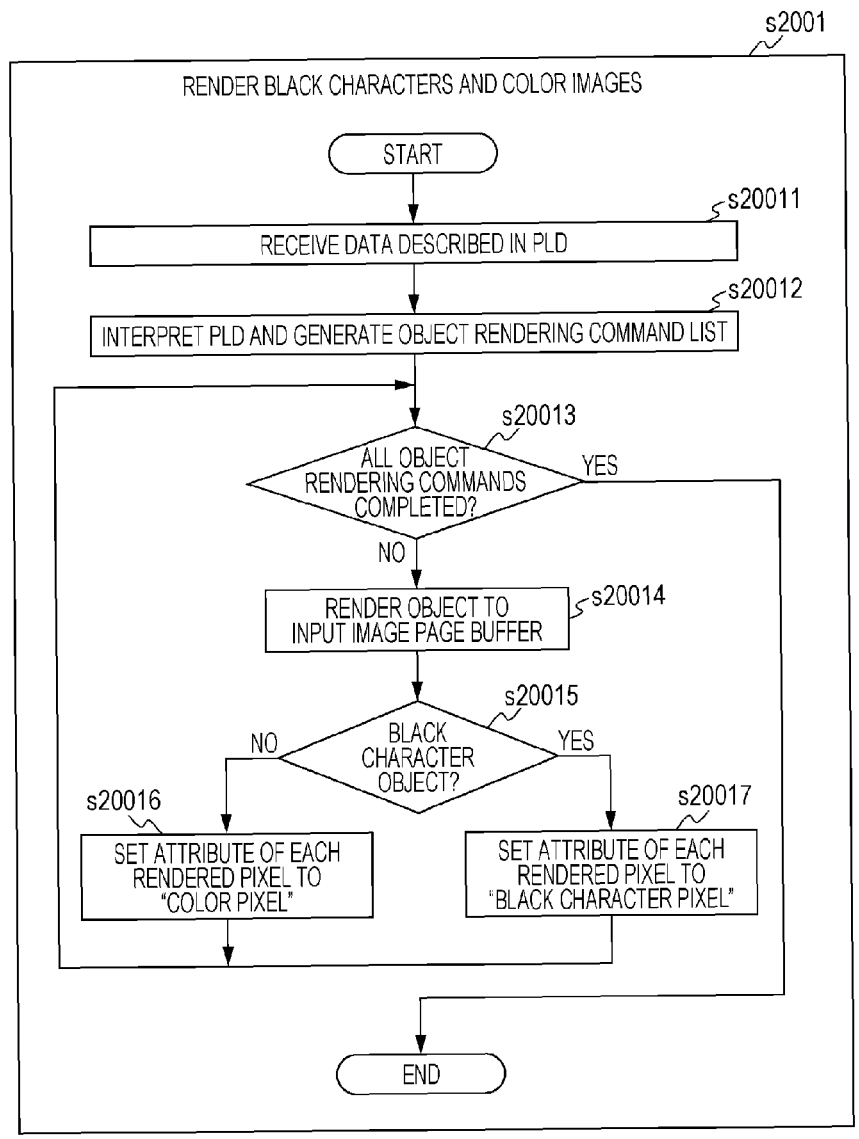
FIG. 5 illustrates an example of preferred processing which involves rendering an input image including black characters and color images according to the first embodiment of the present invention.

FIG. 5 illustrates an example of preferred processing which involves rendering an input image including black characters and color images on the basis of a page description language (PDL) in step s2001. Although broadly referred to as PDL, there are actually the following types of PDLs and any of the existing PDLs can be used:

PostScript and Portable Document Format (PDF) proposed by Adobe Systems Incorporated; and XML Paper Specification (XPS) proposed by Microsoft Corporation.

In step s20011, the host PC 200 receives data described in PDL. In step s20012, the host PC 200 interprets the PDL and generates a list in which object rendering commands are arranged in the order of rendering. In step s20013, if there are no more object rendering commands on the list, the host PC 200 terminates the processing. If there is still any object rendering command on the list, the host PC 200 proceeds to step s20014. In step s20014, the host PC 200 renders an object to be rendered to an input image page buffer this time. Here, the object is rendered at a resolution desired for the final quality of black characters.

The image data to be rendered has 8 bits for each of RGB in the present embodiment. However, the number of bits is not limited to this. The image data may have a greater number of bits, such as 16 bits, for higher gradation expression.

In step s20015, the host PC 200 determines whether the object to be rendered this time is a black character object. If the object is not a black character object, the host PC 200 proceeds to step s20016, whereas if the object is a black character object, the host PC 200 proceeds to step s20017. As a method for determining whether the object is a black character object, the host PC 200 preferably determines whether all the following criteria are satisfied:

Determination criterion 1: the object to be rendered is not a bitmap image; and

Determination criterion 2: the color of the object to be rendered is represented by R=G=B=0.

Generally, in PDL, a photographic image is described to be rendered as a bitmap image, whereas a character object is described in the form of a vector rendering command or a combination of character code and font information. Therefore, the determination as to whether the object to be rendered is a black character can be made using the determination criteria described above.

In step s20016, the host PC 200 sets the attribute of each of pixels rendered this time to "color pixel", and proceeds to step s20013 for processing of the next rendering object. In step s20017, the host PC 200 sets the attribute of each of pixels rendered this time to "black character pixel", and proceeds to step s20013 for processing of the next rendering object.

Figure 7:
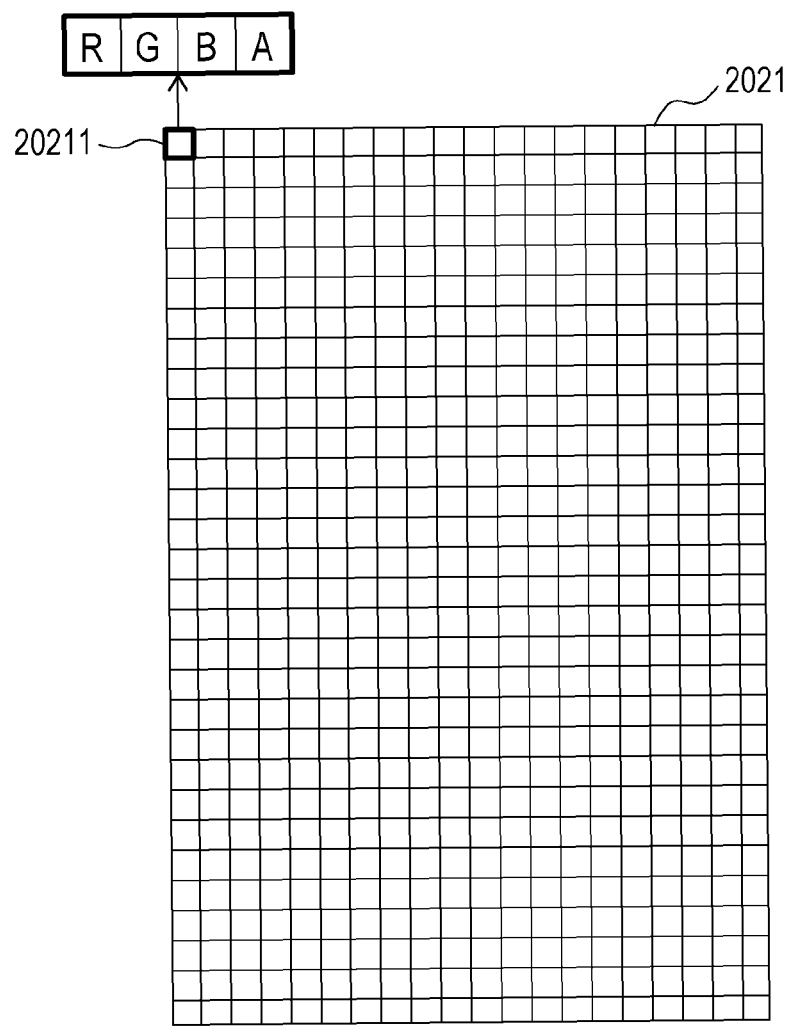
FIG. 7 illustrates an input image page buffer according to the first embodiment of the present invention.

FIG. 7 illustrates an input image page buffer set in the RAM 202 of the host PC 200. An input image page buffer 2021 has a region including pixels arranged in a predetermined number of rows and a predetermined number of columns, and the first pixel therein is indicated by reference numeral 20211. Each pixel is composed of red, green, and blue (RGB) values and an attribute value A. RGB values are data representing color coordinates (R, G, B) in a color space coordinate system, such as an sRGB coordinate system for presentation colors of a monitor. In this case, the host PC 200 sets color information for an RGB region of each pixel in step s20014, and sets a region of an attribute value A in step s20016 or s20017.

Figure 8:
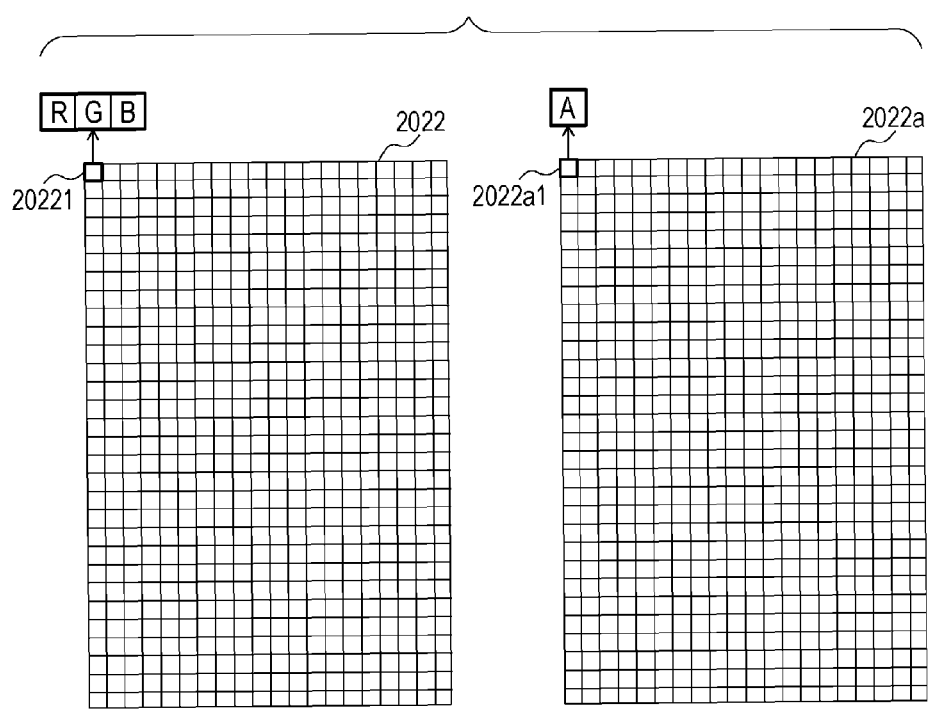
FIG. 8 illustrates another input image page buffer according to the first embodiment of the present invention.

FIG. 8 illustrates another input image page buffer. An input image page buffer 2021 and an attribute value buffer 2022a have each a region including pixels arranged in a predetermined number of rows and a predetermined number of columns, and the first pixels therein are indicated by reference numerals 20221 and 2022a1. Each pixel in the input image page buffer 2021 is composed of RGB values, and each pixel in the attribute value buffer 2021a is composed of an attribute value A. In this case, the host PC 200 sets color information for an RGB region of each pixel in the input image page buffer 2022 in step s20014, and sets a region of an attribute value A in the attribute value buffer in step s20016 or s20017.

Various other embodiments are possible in which, for example, there are individual buffers for R, G, B, and A, but any method can be used. With the buffer configuration of FIG. 7, which requires only one way of address management, it is possible to simplify the control and reduce the program size. With the buffer configuration of FIG. 8, if the number of bits representing an attribute value is smaller than the number of bits representing RGB values, it is possible to reduce the size of the attribute value buffer and reduce the memory usage.

Figure 6:
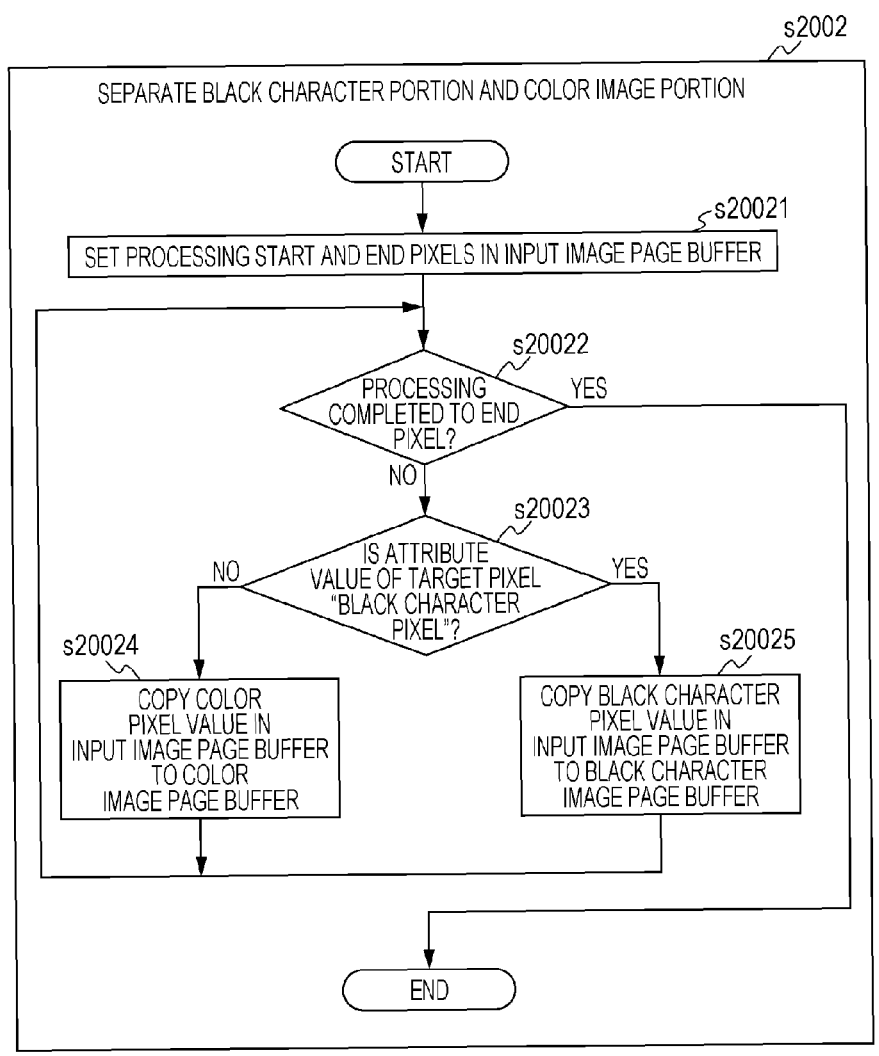
FIG. 6 illustrates an example of preferred processing which involves separating a black character portion and a color image portion and generating a black character image and a color image according to the first embodiment of the present invention.

FIG. 6 illustrates an example of preferred processing which involves separating a black character portion and a color image portion from an input image and generating a black character image and a color image. In step s20021, the host PC 200 sets processing start and end pixels in the input image page buffer. In step s20022, the host PC 200 determines whether the end pixel is reached and there are no more pixels to process. If there are no more pixels to process, the host PC 200 terminates the processing and if there is, the host PC 200 proceeds to step s20023. In step s20023, the host PC 200 determines whether an attribute value of the pixel to be processed is "black character pixel". If the attribute value is not "black character pixel", the host PC 200 proceeds to step s20024. If the attribute value is "black character pixel", the host PC 200 proceeds to step s20025. In step s20024, the host PC 200 copies a color pixel value in the input image page buffer to a color image page buffer, and proceeds to step s20022 for processing the next pixel.

In step s20025, the host PC 200 copies a black character pixel value in the input image page buffer to a black character image page buffer, and proceeds to step s20022 for processing the next pixel.

Figure 9:
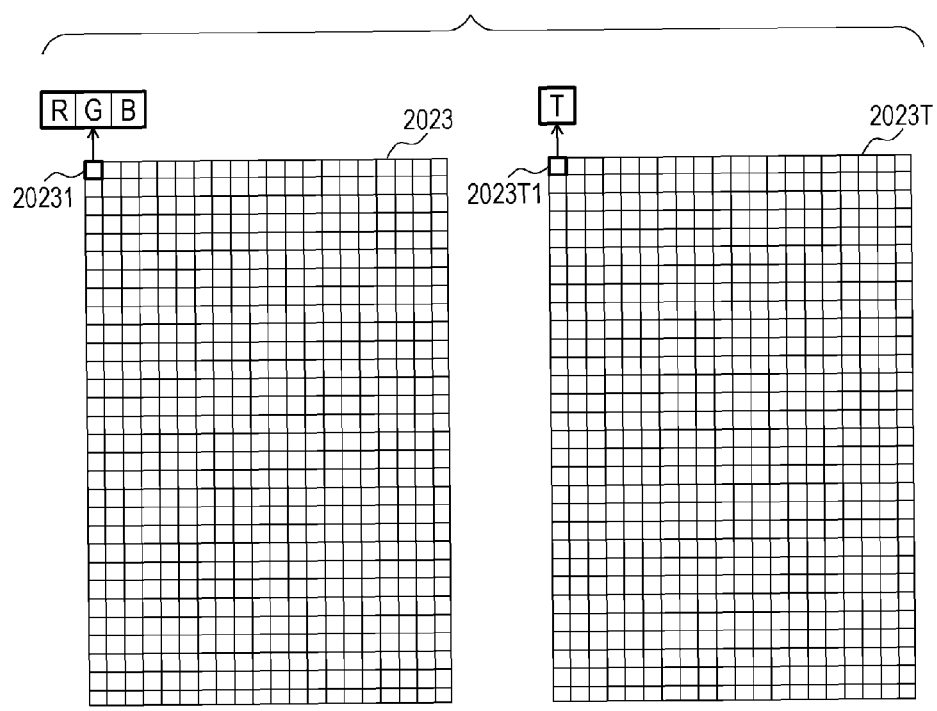
FIG. 9 illustrates a color image page buffer and a black character image page buffer according to the first embodiment of the present invention.

FIG. 9 illustrates a color image page buffer and a black character image page buffer set in the RAM 202 of the host PC 200. A color image page buffer 2023 and a black character image page buffer 2023T have each a region including pixels arranged in the same numbers of rows and columns as those in the input image page buffer, and the first pixels therein are indicated by reference numerals 20231 and 2023T1. A gradation value of each pixel in the color image page buffer 2023 is represented by RGB values, and each pixel in the black character image page buffer 2023T is composed of black character information T. In this case, the host PC 200 sets color information for an RGB region of each pixel in the color image page buffer 2022 in step s20024, and sets the black character information T in the black character image page buffer 2023T in step s20016 or s20017.

The number of bits representing the black character information T in the black character image page buffer 2023T can be smaller than the number of bits representing RGB values. The determination of a black character object in step s20015 involves the use of "Determination criterion 2: the color of the object to be rendered is represented by R=G=B=0". Therefore, when the host PC 200 sets the black character information T in the black character image page buffer 2023T in step s20017, the RGB values of the pixel in the input image page buffer always satisfy "R=G=B=0" and thus can be represented by one bit. It is thus possible to reduce the size of the black character image page buffer 2023T.

In step s2003, the host PC 200 reduces the resolution of the generated color image.

Figure 10:
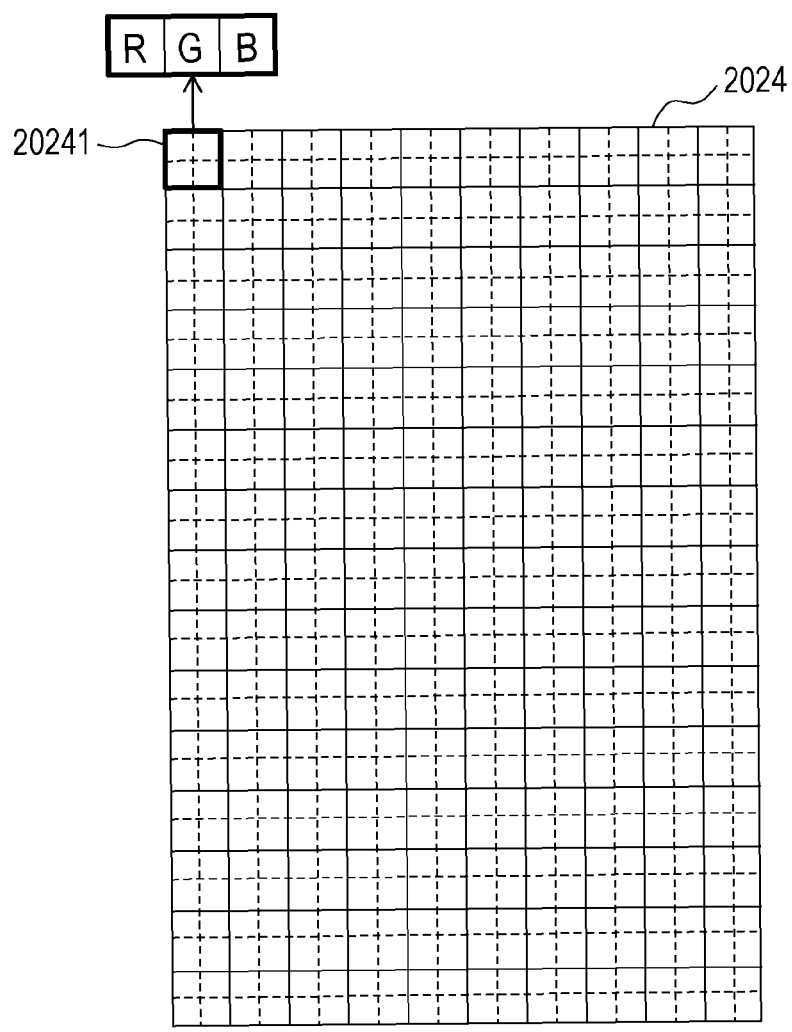
FIG. 10 illustrates a low-resolution color image page buffer according to the first embodiment of the present invention.

Reference numeral 2024 in FIG. 10 indicates a low-resolution color image page buffer set in the RAM 202 of the host PC 200. The low-resolution color image page buffer 2024 has a region including pixels arranged in rows and columns half the numbers of those in the color image page buffer 2023, and the first pixel therein is indicated by reference numeral 20241. Each pixel in the low-resolution color image page buffer 2024 is composed of RGB values.

In step s2003 described above, the host PC 200 reduces the color image in the color image page buffer 2023 to generate a low-resolution color image in the low-resolution color image page buffer.

Solid lines in the low-resolution color image page buffer 2024 represent boundaries between reduced color pixels, whereas broken lines in the low-resolution color image page buffer 2024 represent boundaries between the corresponding color pixels in the color image page buffer of FIG. 9. In the present example, where the reduction ratio in both vertical and horizontal directions is ½, two by two pixels in the color image page buffer correspond to one pixel in the low-resolution color image page buffer.

As a specific example of reduction processing, an average of pixel values of four pixels in the color image page buffer of FIG. 9, that is, an average of pixel values of the first pixel 20231 and pixels below, to the right, and to the lower right of the first pixel 20231, is calculated as a pixel value of the first pixel 20241 in the low-resolution color image page buffer of FIG. 10. Likewise, for every pixel in the low-resolution color image page buffer, reduction processing is performed using the corresponding pixels in the color image page buffer.

In the reduction processing, the reduction ratio is preferably a fraction with a numerator of 1 and an integer denominator. This is because if the reduction ratio is not such a fraction, periodic noise, such as moiré, occurs in the reduction processing. Also, since enlargement processing in step s1004 in the printer 100 can be realized by using an integer multiple, it is possible to simplify the processing and achieve a result favorable in terms of final image quality. It is more preferable that the reduction ratio be a fraction with a numerator of 1 and a power-of-two denominator. With this reduction ratio, it is possible to eliminate the need of division in calculating an average value, and achieve high-speed processing through calculation using bit-shifting.

In step s2004, the host PC 200 compresses the low-resolution color image using lossy compression.

Although a compression method defined in the Joint Picture Expert Group (JPEG) standard is used in the present example, any existing compression method may be used. Lossy compression is selected here, because degradation of details is originally less noticeable than in the case of black characters. Also, in the case of full-color recording using a line head in the printer, misregistration may occur between colors, and even when data accuracy is pursued, it may not be easy to maintain the final image quality.

Compression does not necessarily have to be performed in the present invention. This is because since the number of pixels is already reduced to ½ in both the vertical and horizontal directions, at least the amount of data is ¼ of the original. Therefore, further compression in the entire print system may not be required depending on the balance between the printing speed and the transfer speed. When the number of pixels is reduced to ⅓ in both the vertical and horizontal directions, the amount of data is reduced to ⅑ of the original. When the number of pixels is reduced to ¼ in both the vertical and horizontal directions, the amount of data is reduced to 1/16 of the original.

In step s2005, the host PC 200 compresses the generated black character image using lossless compression.

Although a run-length (RL) compression method is used in the present example, any existing compression method may be used.

Lossless compression is selected here, because reproducibility of details is originally more required than in the case of full-color images. Also, in the case of black character recording, even in recording using a line head in the printer, there is no impact of misregistration between colors. Therefore, the final image quality can be easily maintained by pursuing data accuracy.

As in step s2004, compression does not necessarily have to be performed in the present invention. This is because since the black character information T of each pixel in the black character image page buffer 2023T is represented by one bit, at least the amount of data is ¹⁄₂₄ of the RGB data. Therefore, further compression in the entire print system may not be required depending on the balance between the printing speed and the transfer speed.

In step s2006, the host PC 200 transmits the compressed color image and the compressed black character image to the printer 100.

As described above, since the low-resolution color image and the black character portion not subjected to reduction are used, it is possible to significantly reduce the amount of data transfer while maintaining the quality of black characters. When lossless compression is used for the color image and lossy compression is used for the black character portion, it is possible to further reduce the amount of data transfer while maintaining the quality of black characters. As described above, since the color image and the black character portion are separate pieces of data, a suitable compression method is applicable to each of them.

In step s1001, the printer 100 receives the compressed color image and the compressed black character image from the host PC 200.

The compressed low-resolution color image received here is processed in step s1002. The compressed black character image is processed in step s1005. If compression processing is not performed in the host PC 200, the printer 100 skips steps s1002 and s1005, and processes the low-resolution color image and the black character image in steps s1003 and s1006, respectively.

In step s1002, the printer 100 expands the lossy-compressed color image to generate a low-resolution color image.

The expansion method used here corresponds to the lossy compression method performed in step s2004 in the host PC 200. In the present example, the printer 100 decodes JPEG-compressed data. The decoded data is stored in a low-resolution color image buffer (not shown) in the RAM 212 of the printer 100 in the same format as in the low-resolution color image buffer 2024 illustrated in FIG. 10.

In step s1003, the printer 100 converts the low-resolution color image to low-resolution CMYK ink color data.

RGB values, which represent a pixel value of a low-resolution color image, are data representing color coordinates (R, G, B) in a color space coordinate system, such as an sRGB coordinate system for presentation colors of a monitor. The printer 100 converts the RGB values to ink color density data (CMYK) for the printer by a known technique, such as matrix operation processing or processing using a three-dimensional LUT. The printer 100 of the present embodiment uses inks of black (K), cyan (C), magenta (M), and yellow (Y). Therefore, image data of RGB signals is converted to image data where a gradation value is represented by 8-bit color signals of each of K, C, M, and Y. Although four ink colors, K, C, M, and Y, are described as an example, inks of low-density colors, such as light cyan (Lc), light magenta (Lm), and gray (Gy), may be added to improve image quality.

Figure 11:
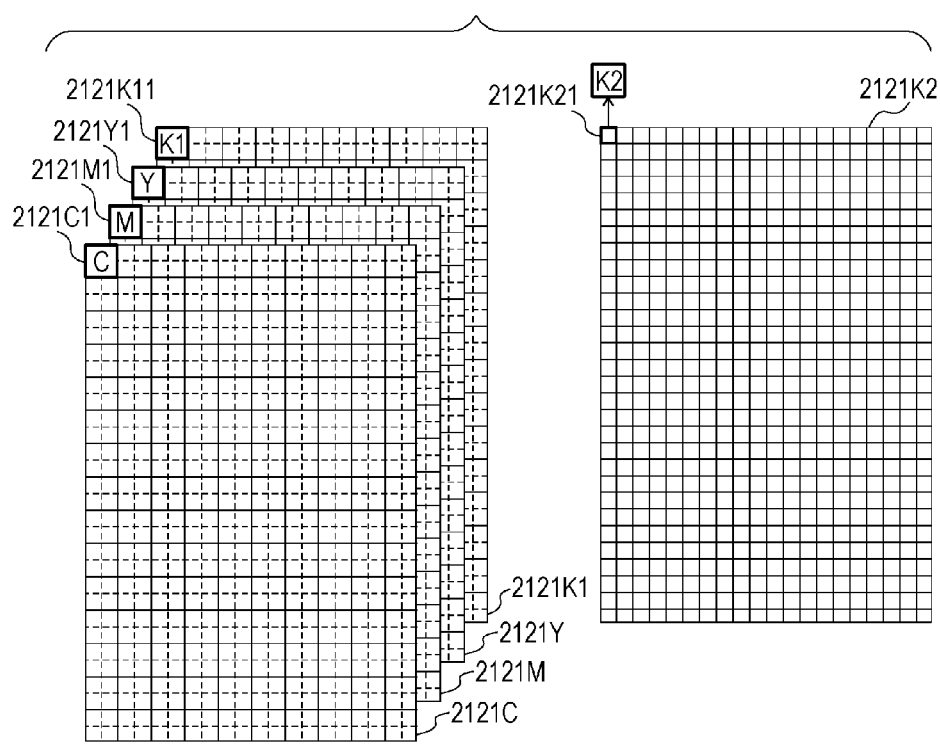
FIG. 11 illustrates a low-resolution CMYK ink color density buffer for a color image portion and a K ink color buffer for a black character portion according to the first embodiment of the present invention.

FIG. 11 illustrates a low-resolution CMYK ink color density buffer for a color image portion and a K ink color buffer for a black character portion that are set in the RAM 212 of the printer 100. The low-resolution CMYK ink color density buffer for a color image portion includes the following four ink color buffers:

low-resolution C ink color density buffer 2121C (the first pixel is indicated by 2121C1, and each pixel represents a C ink color density value);

low-resolution M ink color density buffer 2121M (the first pixel is indicated by 2121M1, and each pixel represents an M ink color density value);

low-resolution Y ink color density buffer 2121Y (the first pixel is indicated by 2121Y1, and each pixel represents a Y ink color density value); and low-resolution K ink color density buffer 2121K1 (the first pixel is indicated by 2121K11, and each pixel represents K1 ink color density value).

The four ink color buffers described above have each a region including pixels arranged in the same numbers of rows and columns as those in the low-resolution color image page buffer 2024, and each pixel contains 8-bit multi-level information. The four ink color buffers have a one-to-one pixel correspondence with the low-resolution color image page buffer 2024. Therefore, for example, RGB values of the first pixel 20241 in the low-resolution color image buffer 2024 illustrated in FIG. 10 are converted to ink colors in step s1003 and the results of the conversion are stored in 2121C1, 2121M1, 2121Y1, and 2121K11 illustrated in FIG. 11.

In step s1004, the printer 100 quantizes the low-resolution CMYK ink color data, and generates CMYK print data serving as first dot data indicating whether to form a dot for forming an image having an image attribute.

For example, error diffusion or dithering can be used as a quantization technique.

Figure 12:
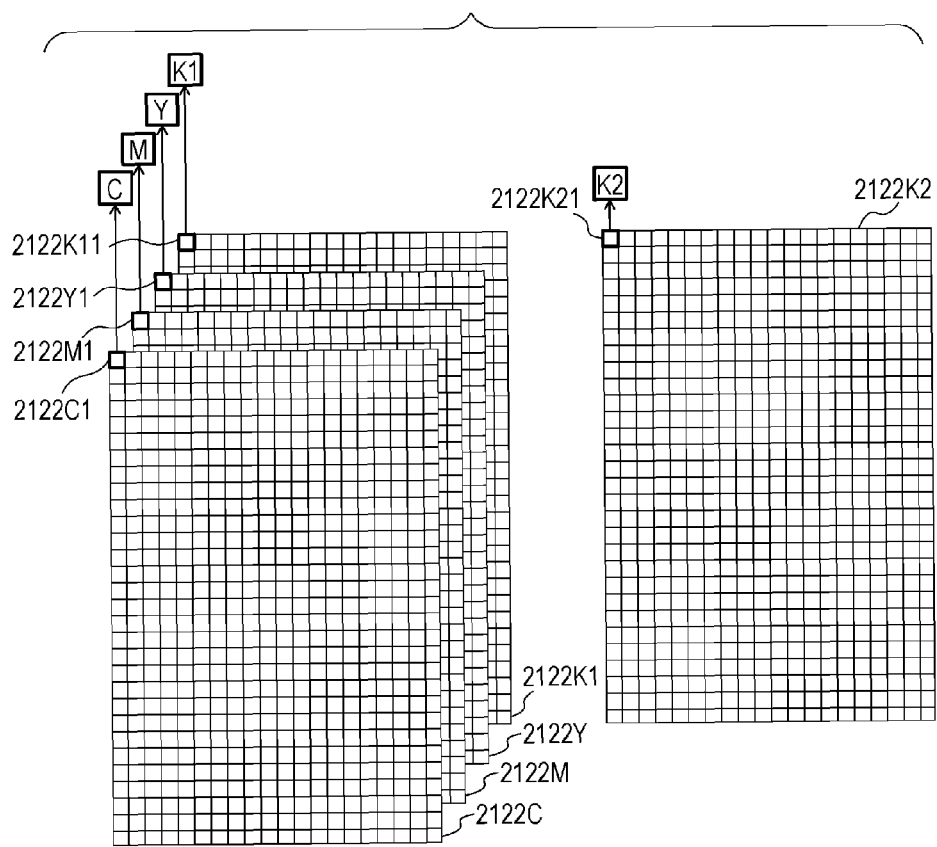
FIG. 12 illustrates a CMYK print data buffer for a color image portion and a K print data buffer for a black character portion according to the first embodiment of the present invention.

FIG. 12 illustrates a CMYK print data buffer for a color image portion and a K print data buffer for a black character portion that are set in the RAM 212 of the printer 100. The low-resolution CMYK ink color density buffer for a color image portion includes the following four ink color buffers:

C print data buffer 2122C (the first pixel is indicated by 2122C1, and each pixel represents C dot On/Off information;

M print data buffer 2122M (the first pixel is indicated by 2122M1, and each pixel represents M ink On/Off information);

Y print data buffer 2122Y (the first pixel is indicated by 2122Y1, and each pixel represents Y ink On/Off information); and K print data buffer 2122K1 (the first pixel is indicated by 2122K11, and each pixel represents K ink On/Off information).

In the present embodiment, the four print data buffers described above have each a region including pixels arranged in the same numbers of rows and columns as those in the input image page buffer 2021. One pixel in each print data buffer corresponds to On/Off of ejection from a recording nozzle. The number of pixels is double that in the low-resolution CMYK ink color data buffer in both the horizontal and vertical directions. That is, when the printer 100 quantizes each ink color data in step s1004 in the present embodiment, one pixel in FIGS. 10 and 11 is divided into four areas corresponding to four pixels, and ON and OFF of a dot are defined for each area corresponding to one pixel. The maximum number of dots that can be assigned to one pixel in the low-resolution CMYK ink color data in accordance with the result of quantization is greater than the maximum number of dots that can be assigned to one pixel in the K ink color density data for black characters (described below) in accordance with the result of quantization. Thus, the print resolutions of dot data for the black character image and dot data for the color image obtained by quantization are brought close to each other. The maximum number of dots assigned to one pixel in the low-resolution CMYK ink color data may be determined in accordance with the reduction ratio of the color image in the resolution reduction processing performed in step s2003 in the host PC 200. For example, the maximum number of dots assigned to one pixel in the low-resolution CMYK ink color data may be determined such that print resolutions of dot data for the black character image and dot data for the color image obtained by the quantization in steps s1004 and s1007 are equal.

Figure 13A:
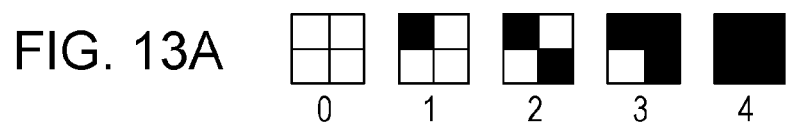
FIG. 13A and FIG. 13B illustrate an example of quantization according to the first embodiment of the present invention.
Figure 13B:

FIG. 13A and FIG. 13B illustrate an example of quantization according to the present embodiment. FIG. 13A illustrates a quantization pattern used in quantization of each ink color data in step s1004. In the present embodiment, the same quantization pattern is used for all ink colors. However, to improve image quality, control may be performed such that a different pattern is used for each ink color, or a quantization pattern is changed at each pixel position.

In step s1005, the printer 100 expands the lossless-compressed black character image to generate a black character image. The expansion method used here corresponds to the lossless compression method performed in step s2005 in the host PC 200. In the present example, the printer 100 decodes RL-compressed data. The decoded data is stored in a low-resolution color image buffer (not shown) in the RAM 212 of the printer 100 in the same format as in the black character image buffer 2023T illustrated in FIG. 9.

In step s1006, the printer 100 converts the black character image to K ink color data. The black character image pixel value T is data representing color coordinates (R=0, G=0, B=0) in a color space coordinate system, such as an sRGB coordinate system for presentation colors of a monitor. The printer 100 converts the black character image pixel value T to K ink color density data (K) for the printer by a known technique, such as matrix operation processing or processing using a one-dimensional LUT. Although one ink color K is described as an example, an ink of low-density color, such as gray (Gy), may be added to improve image quality.

Referring to FIG. 11, a K ink page buffer 2121K2 for a black character portion has a region including pixels arranged in the same numbers of rows and columns as those in the input image page buffer, and the first pixel therein is indicated by reference numeral 2121K21. Each pixel in the black character image page buffer 2023T is composed of a black ink value K2. Because of a one-to-one pixel correspondence, for example, the black character information T of the first pixel 2023T1 in the black character image page buffer 2023T illustrated in FIG. 9 is converted to K ink color data in step s1006 and the result of the conversion is stored in 2121K21 illustrated in FIG. 11. Although the black character information T is bi-level, the K ink color data obtained by the conversion is 8-bit multi-level data. By controlling the density of K ink for the black character portion using multi-level data, it is possible to control the amount of ink recording appropriate for the recording medium.

In step s1007, the printer 100 reduces the gradation of the K ink color data through quantization, and generates K print data. As in step s1004, error diffusion or dithering can be used as a quantization technique. In the present embodiment, however, it is preferable that dithering, rather than error diffusion, be used as a quantization technique in both steps s1004 and s1007. This is because error diffusion diffuses quantization error resulting from the quantization over the neighboring pixels. In the present embodiment, where the color image portion and the black character image portion are separately quantized, the error cannot be properly transmitted in an image region where color image portions and black character image portions are present alternately.

Referring to FIG. 12, a K print data buffer 2122K2 for a black character portion has a region including pixels arranged in the same numbers of rows and columns as those in the K ink page buffer 2121K2 for a black character portion, and the first pixel therein is indicated by reference numeral 2122K21. One pixel in the print data buffer corresponds to On/Off of ejection from a recording nozzle. This is because when each ink color data is quantized in step s1006 in the present embodiment, the ink color data is quantized in two levels of a one-by-one pixel.

FIG. 13B illustrates a quantization pattern used in quantization of K ink color data in step s1007.

In the present embodiment, the scale factor for reduction of resolution in step s2003 in the host PC 200 is ½×½, the color image portion is enlarged by a scale factor of 2×2 in step s1004 in the printer 100, and the black character portion is enlarged by a scale factor of 1×1 in step s1006 in the printer 100.

However, the scale factor for reduction of resolution and the scale factor for enlargement do not necessarily need to be the reciprocals of each other. For example, when the scale factor for reduction of resolution is ½×½, the color image portion may be enlarged by a scale factor of 4×4 in step s1004 in the printer 100, and the black character portion may be enlarged by a scale factor of 2×2 in step s1007 in the printer 100. That is, it is only necessary that the reduction ratio for reducing the color image portion and the black character portion and the enlargement ratio for enlarging the color image portion and the black character portion be the reciprocals of each other.

In step s1008, the printer 100 combines the CMYK print data generated in step s1004 with the K print data generated in step s1007 to generate composite CMYK print data which is image formation data used by the printer for printing.

A composite CMYK print data buffer has the same configuration as the CMYK print data buffer for a color image portion illustrated in FIG. 12. Specifically, the printer 100 takes the logical sum of the K print data in the K print data buffer for color images and the K print data in the K print data buffer for black characters in FIG. 12, and generates K print data in the composite CMYK print data. C print data, M print data, and Y print data in the composite CMYK print data are the same as C print data, M print data, and Y print data in the CMYK print data generated in step s1004.

Bi-level data (dot data) obtained by quantization is recorded, for each pixel position, to indicate which ink is to be ejected. When a photographic portion and a character portion are exclusively separated, ink for the character portion is not ejected at a pixel position where ink for the photographic portion is ejected. Conversely, ink for the photographic portion is not ejected at a pixel position where ink for the character portion is ejected. Therefore, in step s1008, if the photographic portion and the character portion are exclusively separated, the printer 100 can generate composite data by simply adding two pieces of quantized data, instead of taking their logical sum.

In step s1009, the printer 100 records the composite print data using a recording head.

On the basis of the bi-level data (dot data) obtained by the quantization, the printer 100 performs recording by driving the recording head and ejecting inks of respective colors on a recording medium. In the present embodiment, recording is performed by a recording mechanism including the recording heads 101 to 104 illustrated in FIG. 1.

In the present embodiment, a determination as to whether the pixel is "black character pixel" or "color pixel" is made using two criteria, and data processing is performed at different resolutions depending on the determination. However, the scope of application of the present invention is not limited to the combination described above, and various other targets and determination criteria may be used.

For example, when data processing is performed at different resolutions for "single ink color pixel" and "multiple ink color pixel", there is no risk of color misregistration and high-resolution image formation is possible for characters formed using a single ink color. In this case, specific examples of the determination criteria are as follows:

Determination criterion 1: the object to be rendered is not a bitmap image; and

Determination criterion 2: one of R, G, and B of the color of the object to be rendered is 0, and the remaining two are 255.

Preconditions here are that image formation is performed using only a cyan ink in the case of R=0 and G=B=255, using only a magenta ink in the case of G=0 and R=B=255, and using only a yellow ink in the case of B=0 and R=G=255.

In this case, each single color ink character data is subjected to the same processing as that for black characters, combined with color image data, and output. Thus, high-resolution characters are realized not only for black characters, but also for single color ink characters.

Instead of determining using RGB values, the printer 100 may convert the RGB values to CMYK values actually used in printing, and make a determination using the amount of ink.

In the example described above, whether the object to be rendered is a bitmap image is used as a character determination criterion. However, the determination criterion is not necessarily limited to this, and any of the following criteria may be used:

the rendering object is a character object;
the rendering object is a vector rendering object;
the rendering object is a 1-bit bi-level bitmap object; and
the rendering intent in PDF format is colorimetric.

Thus, it is possible to reduce both the amount of data transfer and the amount of processing in the printer while maintaining the recording quality of black characters.

Second Embodiment

In the first embodiment, in step s2001, the host PC 200 first renders an input image including black characters and color images in accordance with a page description language (PDL). In step s2002, the host PC 200 separates a black character portion and a color image portion from the input image to generate a black character image and a color image.

In the first embodiment, where full-color rendering is performed at the same resolution as that for black characters, the processing time for rendering increases when the quality of black characters is increased by using higher resolution.

In the present embodiment, steps s2001 and s2002 are brought together, and rendering is performed at high speed by a method in which "from the beginning, a color image is rendered at low resolution, and a black character image is rendered at high resolution".

Figure 14:
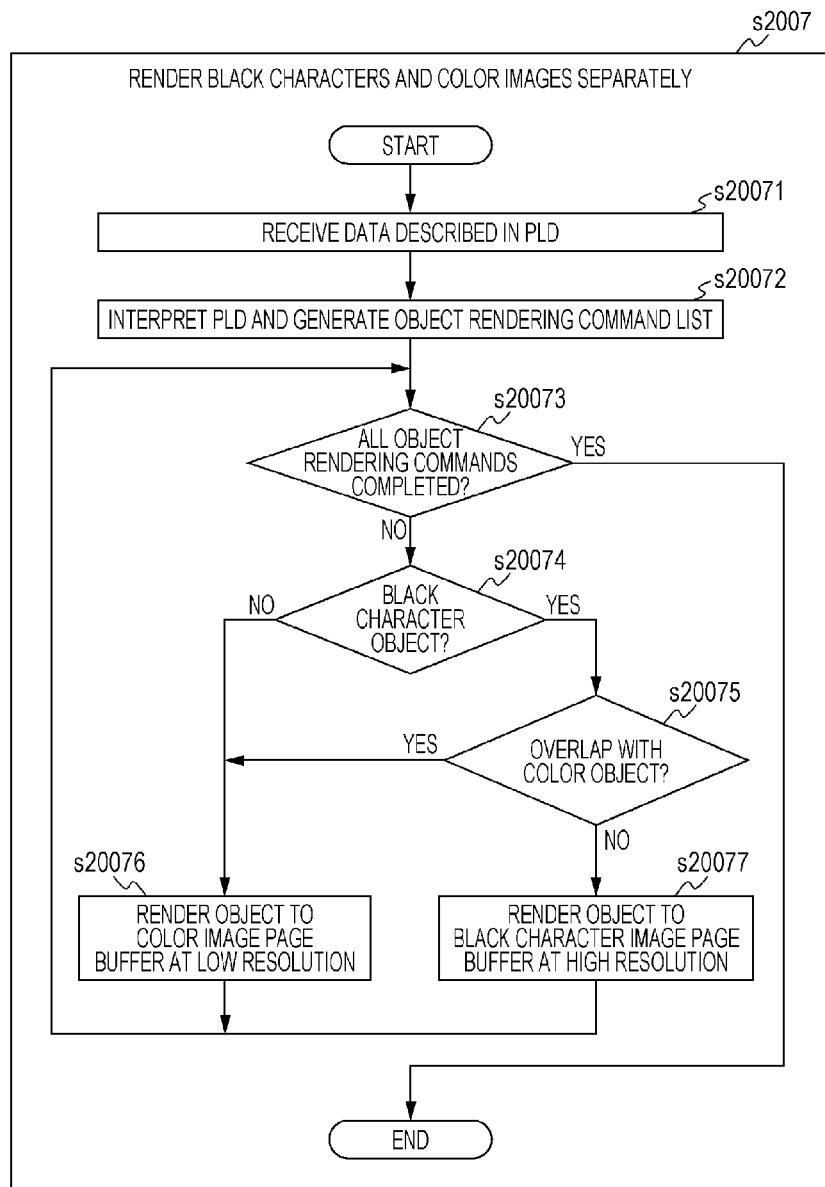
FIG. 14 is a flowchart illustrating an example of preferred rendering processing which involves rendering an input image including black characters and color images, separating a black character portion and a color image portion, and generating a black character image and a color image, according to a second embodiment of the present invention.

FIG. 14 is a flowchart illustrating an example of preferred rendering processing which involves rendering an input image including black characters and color images, separating a black character portion and a color image portion, and generating a black character image and a color image, according to the present embodiment. Step s2007 corresponds to steps s2001 and s2002 of FIG. 4.

In step s20071, the host PC 200 receives data described in PDL.

In step s20072, the host PC 200 interprets the PDL and generates a list in which object rendering commands are arranged in the order of rendering.

In step s20073, if there are no more object rendering commands on the list, the host PC 200 terminates the processing. If there is still any object rendering command on the list, the host PC 200 proceeds to step s20014.

In step s20074, the host PC 200 determines whether the object to be rendered this time is a black character object. If the object is not a black character object, the host PC 200 proceeds to step s20076, whereas if the object is a black character object, the host PC 200 proceeds to step s20075.

In step s20075, the host PC 200 checks whether a rendering region of the black character object overlaps with that of any color object. If there is such an overlap, the host PC 200 proceeds to step s20076, whereas if there is no overlap, the host PC 200 proceeds to step s20077.

In step s20076, the host PC 200 renders the object to the color image page buffer at low resolution, and returns to step s20073.

In step s20077, the host PC 200 renders the object to the black character image page buffer at high resolution. To reduce the amount of memory usage, the object may be reduced to 1-bit information before being rendered. Then, the host PC 200 returns to step s20073.

Figure 15:
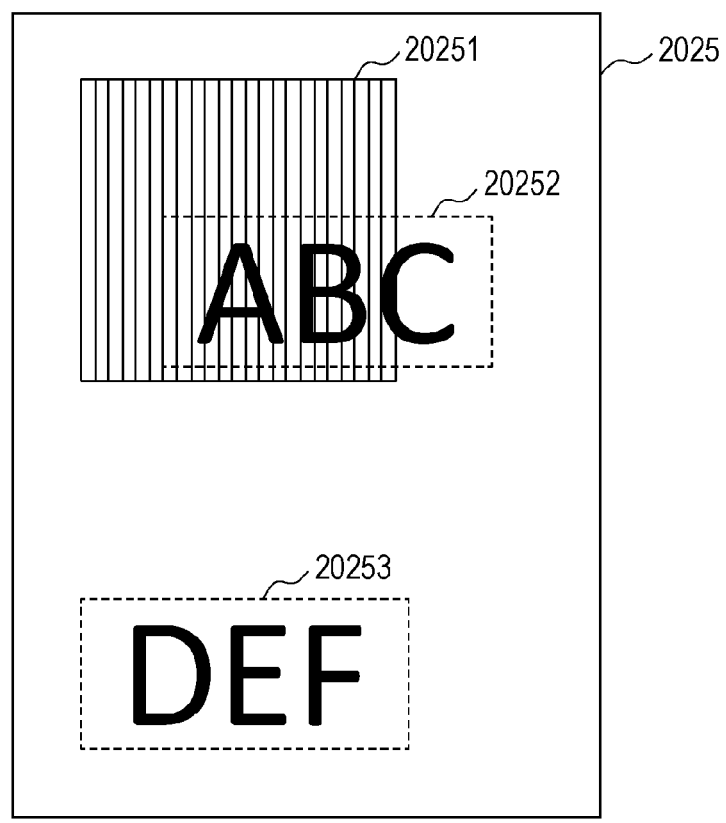
FIG. 15 illustrates an example of PDL processing according to the second embodiment of the present invention.

FIG. 15 illustrates an example of PDL processing in the present embodiment. There are a color image object 20251 and black character objects 20252 and 20253 in a canvas 2025. In this case, in the present embodiment, since the rendering region of the black character object 20252 overlaps with that of the color image object 20251, the black character object 20252 is rendered to the color image page buffer at low resolution. Since the rendering region of the black character object 20253 does not overlap with that of the color image object 20251, the black character object 20253 is rendered to the black character image page buffer at high resolution.

Thus, since the color image page buffer is created, it is possible to improve quality of black characters without involving the process of high-resolution rendering and reduction.

Although only the case of R=G=B=0 has been described for black characters, the effect of the present invention is not limited to this. A determination for black characters may be made using a criterion of R=G=B. In this case, each pixel value in the black character image buffer is represented by 8-bit data. Thus, it is possible also for gray characters to reduce data to ⅓ of RGB 24-bit data while realizing high-resolution recording.

Also, it is possible to perform high-resolution recording of black character data only for a specific gradation value using a plurality of bits.

The present invention is applicable to high-resolution recording for not only K ink, but also other specific ink colors.

Although most multi-level data has been described as 8-bit data, multi-level data with a greater number of bits may be used for higher gradation expression.

In the embodiments of the present invention described above, it is possible to reduce the load of print data generation processing, particularly the load of color image processing.

According to the present invention, it is possible to generate data for image formation without causing heavy load.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing method comprising:
    a dividing step of dividing input image data including a character portion and an image portion into first image data representing gradation of the character portion and second image data representing gradation of the image portion;

a reducing step of reducing a resolution of a non-character image represented by the second image data obtained by the dividing step and obtaining low resolution second image data;

an acquiring step of acquiring the first image data and the low resolution second image data, wherein the resolution of the image represented by the low resolution second image data is lower than the resolution of the image represented by the first image data;

a first generating step of generating first dot data indicating whether to form a dot for forming an image of the characters, from the character portion, on a recording medium, in accordance with a gradation value of each pixel in the first image data acquired in the acquiring step;

a second generating step of generating second dot data indicating whether to form a dot for forming an image of the non-character image on the recording medium, in accordance with a gradation value of each pixel in the second image data acquired by the acquiring unit; and a third generating step of generating, on the basis of the first dot data generated in the first generating step and the second dot data generated in the second generating step, image formation data for forming an image on the recording medium.

2. The image processing method according to claim 1, wherein the first generating step generates the first dot data by performing quantization using dithering, and the second generating step generates the second dot data by performing quantization using dithering.

3. The image processing method according to claim 1, wherein the first image data and the low resolution second image data are each image data having multi-level gradation values.

4. The image processing method according to claim 1, wherein the acquiring step decompresses the first image data and the low resolution second image data in a compressed state.

5. A non-transitory computer-readable medium storing a program that, when executed, causes a computer to execute the image processing method according to claim 1.

6. The image processing method according to claim 1, wherein in the second generating step, generating the second dot data includes assigning a number of dots to each pixel in the second image data, the number being greater than a maximum number of dots to be assigned by the first generating step to each pixel in the first image data.

7. The image processing method according to claim 1, wherein the first image data is data for a black character image, and wherein the second image data is data for a color image.

8. The image processing method according to claim 1, further comprising a recording step of recording on the recording medium based on the image formation data generated by the third generating step.

9. An image processing apparatus connected to an information processing apparatus, the image processing apparatus comprising:
memory; and
one or more processors, the one or more processors configured to perform:

an acquiring step of acquiring first image data and low resolution second image data, wherein the resolution of the image represented by the low resolution second image data is lower than the resolution of the image represented by the first image data, and wherein the image processing apparatus receives the first image data and the low resolution second image data from the information processing apparatus, and the information processing apparatus generates the first image data and the low resolution second image data by dividing input image data having a character portion and an image portion into the first image data representing gradation of the character portion and second image data representing gradation of the image portion, and reducing a resolution of a non-character image represented by the second image data to generate the low resolution second image data;

a first generating step of generating first dot data indicating whether to form a dot for forming an image of the characters, from the character portion, on a recording medium, in accordance with a gradation value of each pixel in the first image data acquired in the acquiring step;

a second generating step of generating second dot data indicating whether to form a dot for forming an image of the non-character image on the recording medium, in accordance with a gradation value of each pixel in the second image data acquired by the acquiring unit; and a third generating step of generating, on the basis of the first dot data generated in the first generating step and the second dot data generated in the second generating step, image formation data for forming an image on the recording medium.

10. The image processing apparatus according to claim 9, wherein the first generating step generates the first dot data by performing quantization using dithering, and the second generating step generates the second dot data by performing quantization using dithering.

11. The image processing apparatus according to claim 9, wherein the first image data and the low resolution second image data are each image data having multi-level gradation values.

12. The image processing apparatus according to claim 9, wherein the acquiring step decompresses the first image data and the low resolution second image data in a compressed state.

13. The image processing apparatus according to claim 9, wherein in the second generating step, generating the second dot data includes assigning a number of dots to each pixel in the second image data, the number being greater than a maximum number of dots to be assigned by the first generating step to each pixel in the first image data.

14. The image processing apparatus according to claim 9, wherein the first image data is data for a black character image, and wherein the second image data is data for a color image.

15. The image processing apparatus according to claim 9, wherein the one or more processors are further configured to perform a recording step of recording on the recording medium based on the image formation data generated by the third generating step.

* * * * *